United States Patent
Huang et al.

(10) Patent No.: US 9,860,064 B2
(45) Date of Patent: Jan. 2, 2018

(54) ENCRYPTED PASSWORD TRANSPORT ACROSS UNTRUSTED CLOUD NETWORK

(71) Applicant: Citrix Systems, Inc., Fort Lauderdale, FL (US)

(72) Inventors: Feng Huang, Cambridge (GB); Andrew David Cooper, Royston (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 128 days.

(21) Appl. No.: 15/062,510

(22) Filed: Mar. 7, 2016

(65) Prior Publication Data

US 2017/0257215 A1  Sep. 7, 2017

(51) Int. Cl.
| *G06F 3/0482* | (2013.01) |
| *G06F 3/0481* | (2013.01) |
| *G06F 3/0486* | (2013.01) |
| *G06F 17/24* | (2006.01) |
| *H04L 9/30* | (2006.01) |
| *H04L 29/06* | (2006.01) |
| *H04L 29/08* | (2006.01) |

(52) U.S. Cl.
CPC ............. *H04L 9/30* (2013.01); *H04L 63/083* (2013.01); *H04L 67/141* (2013.01)

(58) Field of Classification Search
CPC ........ H04L 9/30; H04L 67/141; H04L 63/083
See application file for complete search history.

(56) References Cited

U.S. PATENT DOCUMENTS

| 8,549,295 | B2 * | 10/2013 | Zhang | H04L 63/0428 713/169 |
| 2007/0061571 | A1 * | 3/2007 | Hammes | G06F 21/31 713/168 |
| 2008/0133905 | A1 * | 6/2008 | Challener | H04L 9/3226 713/156 |
| 2012/0084570 | A1 * | 4/2012 | Kuzin | G06F 21/41 713/182 |
| 2014/0331060 | A1 * | 11/2014 | Hayton | G06F 21/31 713/186 |

(Continued)

FOREIGN PATENT DOCUMENTS

EP   1531596 A2   5/2005

*Primary Examiner* — Morshed Mehedi
(74) *Attorney, Agent, or Firm* — BainwoodHuang

(57) ABSTRACT

A computer in an untrusted cloud network functions as a cloud-based enterprise application store via which a client computer (client) establishes a connection to an enterprise application in a trusted enterprise network. User authentications are performed in both a login phase and subsequent application launch phase, each authentication receiving from the client and transmitting to the enterprise network an encrypted password and encrypted key, the encrypted password being a user password encrypted under a first one-use symmetric key, the encrypted key being the first symmetric key encrypted under a public key of a private/public key pair of the enterprise network. The enterprise network decrypts the encrypted key and encrypted password to obtain the user password for authenticating the user. The launch-phase authentication includes use of a login ticket including a second one-use symmetric key under which the user password is encrypted and stored in encrypted form in the enterprise network.

20 Claims, 6 Drawing Sheets

(56) References Cited

U.S. PATENT DOCUMENTS

2015/0012751 A1* 1/2015 Forster ............... H04L 9/30
  713/171
2015/0222619 A1* 8/2015 Hughes ............... H04L 63/08
  713/168
2016/0021101 A1* 1/2016 Balc'h ............... H04L 63/0823
  713/171

* cited by examiner

LOGIN PHASE

PERFORM FIRST USER AUTHENTICATION FOR A USER OF CLIENT COMPUTER AND RECEIVE AND FORWARD SECURITY IDENTIFIERS TO ENTERPRISE APPLICATION STORE:

80

(1) RECEIVING A VALIDATION REQUEST FOR THE USER INCLUDING AN ENCRYPTED PASSWORD AND AN ENCRYPTED KEY, THE ENCRYPTED PASSWORD BEING USER PASSWORD ENCRYPTED UNDER FIRST ONE-USE SYMMETRIC KEY, THE ENCRYPTED KEY BEING THE FIRST ONE-USE SYMMETRIC KEY ENCRYPTED UNDER PUBLIC KEY OF PRIVATE/PUBLIC KEY PAIR OF CLOUD SERVICES AGENT;

(2) DECRYPTING THE ENCRYPTED KEY AND THE ENCRYPTED PASSWORD TO OBTAIN THE USER PASSWORD AND PERFORMING A LOCAL LOGIN OPERATION IN THE TRUSTED COMPUTING NETWORK TO AUTHENTICATE THE USER AND RETURN THE SECURITY IDENTIFIERS TO THE ENTERPRISE APPLICATION STORE

APPLICATION LAUNCH PHASE

82

PERFORMING SECOND USER AUTHENTICATION AS PART OF ESTABLISHING CONNECTION TO ENTERPRISE APPLICATION:

(1) RECEIVING ENCRYPTED PASSWORD AND ENCRYPTED KEY FROM ENTERPRISE APPLICATION STORE AND DECRYPTING ENCRYPTED KEY AND ENCRYPTED PASSWORD TO OBTAIN USER PASSWORD;

(2) RE-ENCRYPTING USER PASSWORD UNDER SECOND ONE-USE SYMMETRIC KEY TO GENERATE SECOND ENCRYPTED PASSWORD, AND CALCULATING CRYPTOGRAPHIC FUNCTION (e.g., HASH FN) OF SECOND ONE-USE SYMMETRIC KEY TO GENERATE CRYPTOGRAPHIC VALUE (e.g., HASH VAL) ;

(3) FORWARDING THE SECOND ENCRYPTED PASSWORD AND CRYPTOGRAPHIC VALUE TO APPLICATION DELIVERY AGENT OF TRUSTED COMPUTING NETWORK FOR USE IN CONFIRMING AUTHENTICITY OF A SUBSEQUENT CONNECTION REQUEST FROM CLIENT COMPUTER, ;

(4) SENDING LOGIN TICKET TO ENTERPRISE APPLICATION STORE INCLUDING SECOND SYMMETRIC KEY TO ENABLE CLIENT COMPUTER TO INCLUDE A REFERENCE TO SECOND ENCRYPTED PASSWORD AND CRYPTOGRAPHIC VALUE IN THE SUBSEQUENT CONNECTION REQUEST TO APPLICATION DELIVERY AGENT

Fig. 9

ENCRYPTED PASSWORD TRANSPORT ACROSS UNTRUSTED CLOUD NETWORK

BACKGROUND

The invention is related to the field of computer system security.

SUMMARY

Customers of cloud services want to ensure that sensitive data such as user passwords are not accessible to the cloud services they use. However, traditional user authentication methods (such as SAML and OAuth) may have limitations if used with certain remote-access services, such as the XenApp™ and XenDesktop™ products of Citrix Systems Inc., as the desktop operating system (e.g., Windows) may require the plaintext password to create a user session.

The presently disclosed technique can provide a secure solution to encrypt the password at the client web browser before it flows through the cloud. It thus can ensure that the plaintext password and the private key required for decryption do not flow through the cloud. The password can only be decrypted by the on-premises (enterprise network) servers that possess the private key to perform a login.

More particularly, a method is disclosed of operating a computer in an untrusted cloud computing network as a cloud-based enterprise application store via which a client computer establishes a connection to an enterprise application executing in a trusted computing network.

The method includes, in a login phase, performing a first user authentication for a user of the client computer and receiving security identifiers from the trusted computing network, the security identifiers identifying the user as an authorized user of the trusted computing network. The first user authentication includes (1) transmitting a public key of a private/public key pair of the trusted computing network to the client computer and (2) subsequently receiving from the client computer and transmitting to the trusted computing network an encrypted password and encrypted key, the encrypted password being a user password encrypted under a first one-use symmetric key, the encrypted key being the first one-use symmetric key encrypted under the public key. The trusted computing network decrypts the encrypted key and the encrypted password to obtain the user password for authenticating the user and returning the security identifiers to the enterprise application store.

The method further includes, in a subsequent application launch phase, performing a second user authentication as part of establishing the connection to the enterprise application. The second user authentication includes (1) transmitting the encrypted password and encrypted key to the trusted computing network and (2) subsequently receiving from the trusted computing network and transmitting to the client computer a login ticket, the login ticket including a second one-use symmetric key under which the user password is encrypted and stored in encrypted form within the trusted computing network. The client computer subsequently transmits a connection-establishment message including the login ticket to the trusted computing network, the trusted computing network decrypting the encrypted form using the second one-use symmetric key from the login ticket of the connection-establishment message to obtain the user password for authenticating the user and establishing the connection of the client computer to the enterprise application.

In particular embodiments, the connection of the client computer to the enterprise application is via a remote desktop session delivered by a virtual desktop agent of the enterprise network, and wherein the connection-establishment message is a request from the client computer for the virtual desktop agent to initiate the remote desktop session.

In particular embodiments, the trusted computing network includes a cloud interface server and one or more application/services servers, the application/services servers hosting the enterprise application, the cloud interface server providing a local interface to the enterprise application store, and wherein the private/public key pair of the trusted computing network is a private/public key pair of the cloud interface server.

In particular embodiments, the second one-use symmetric key is in encrypted form in the login ticket, the encrypted form having been asymmetrically encrypted with a second public key of a second private/public key pair of the enterprise network so as to be securely transmitted in the cloud network and decrypted only within the enterprise network.

In particular embodiments, the second user authentication in the application launch phase includes obtaining a second login ticket from a ticket authority of the cloud network and transmitting the second login ticket to the client computer; and the connection-establishment message is transmitted to a gateway of the enterprise network which uses the second login ticket in an exchange with the ticket authority to obtain an address for a virtual desktop agent of the enterprise network to which the connection-establishment message is to be sent, and subsequently sends the connection-establishment message to the virtual desktop agent.

Also disclosed is a corresponding method by which a cloud services agent in the enterprise network operates, as well as special-purpose computers for use as the enterprise application store and cloud services agent.

The disclosed methods and apparatus can ensure that an encrypted password never flows back to the browser and only a one-time ticket is sent back to the client computer. The use of asymmetric encryption for the symmetric key ensures that the logon ticket travelling through the cloud services cannot be directly used to decrypt the re-encrypted password.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIGS. 8 and 9 are flow diagrams depicting operation of an enterprise application store and a cloud services agent respectively.

DETAILED DESCRIPTION

Figure 1:
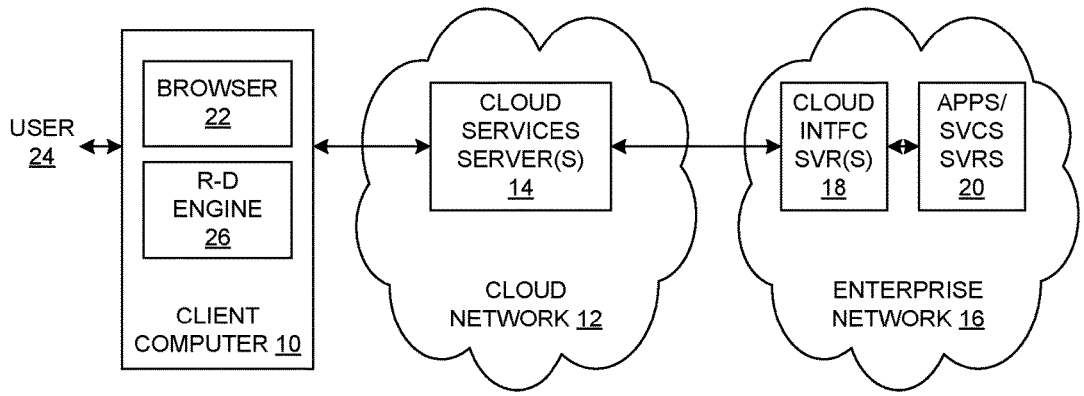
FIG. 1 is a block diagram of a computer system.

FIG. 1 shows a distributed computing system having client computers 10 (one shown for simplicity), a cloud network 12 having cloud services servers 14, and an enterprise network 16 having cloud interface servers (CLOUD INTFC SVRS) 18 and applications/services servers (APPS/SVCs SVRs) 20. As shown, the client computer 10 includes a browser 22 or similar program enabling a user 24 to log in to remote services, and a remote-desktop engine (R-D ENGINE) 26 used to render a remotely delivered application or virtual desktop on a local display of the client computer 10.

In operation, the client computer 10 establishes connections to the enterprise network 16 in order to utilize applications or services provided therefrom, for example to establish remote desktop sessions via which enterprise applications (such as database applications, collaboration applications, analysis/simulation applications, etc.) are delivered. The enterprise applications execute on the application/services servers 20 and provide user interfaces (for input and output) over the remote desktop sessions. The cloud services servers 14 serve as off-premises components for facilitating such remote user access. The cloud network 12 is referred to herein as "untrusted" based on its separation from the more secure and "trusted" enterprise network 16. The cloud network 12 may be provided in part by a third-party cloud computing service provider, for example. One key aspect of operation is user authentication, in particular the need to securely handle sensitive information such as a user password that is necessarily transmitted through the cloud network 12 during a user authentication process. This aspect of operation is described in some detail below.

Figure 2:
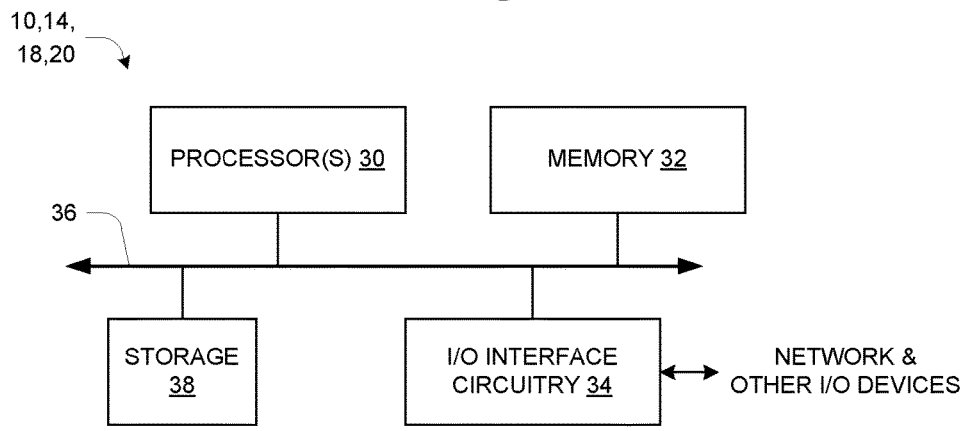
FIG. 2 is a hardware block diagram of a computer.

FIG. 2 shows an example configuration of a physical computer such as the client computer 10 or one of the servers 14, 18 or 20 from a computer hardware perspective. The hardware includes one or more processors 30, memory 32, and interface circuitry 34 interconnected by data interconnections 36 such as one or more high-speed data buses. The interface circuitry 34 provides a hardware connection to a network (such as the cloud network 12 or enterprise network 16, FIG. 1) and perhaps other external devices/connections (EXT DEVs). The processor(s) 30 with connected memory 32 may also be referred to as "processing circuitry" herein. There may also be local secondary storage 38 such as a local-attached disk drive or Flash drive. In operation, the memory 32 stores data and instructions of system software (e.g., operating system) and one or more application programs which are executed by the processor(s) 30 to cause the hardware to function in a software-defined manner. Thus the computer hardware executing instructions of a cloud services application, for example, can be referred to as a cloud services component. It will be understood that a collection of such components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

Figure 3:
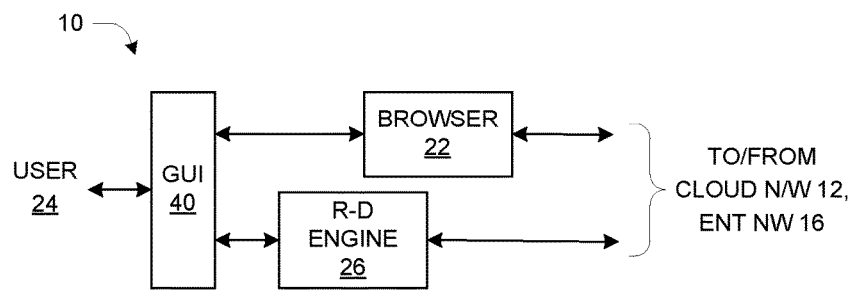
FIG. 3 is a functional block diagram of a client computer.

FIG. 3 shows the client computer 10. It includes a graphical user interface (GUI) 40 along with the browser 22 and remote desktop engine 26. These are software-implemented components such as generally described above and such as generally known in the art. The GUI 40 is typically part of an operating system such as the Windows® or MAC® operating systems. The browser 22 can be implemented as an enhanced version of a standard Web browser, e.g., Firefox® or Internet Explorer®, incorporating certain specific functionality as described more herein. The remote desktop engine 26 is a local component capable of rendering a remotely-delivered application or desktop on a display of the client computer 10. In one example the remote desktop engine 26 may incorporate HDX™ technology of Citrix Systems Inc.

In operation, the browser 22 and remote desktop engine 26 interact with the cloud network 12 and enterprise network 16 to authenticate the user 24 to the enterprise network 16 and enable the user 24 to obtain computing services therefrom. In the examples herein, the computing services include remote desktop sessions in which the user 24 interacts with a virtualized personal computer using a standard desktop paradigm. The remote desktop is executed by an application server 20 within the enterprise network 16, with communications (including desktop session establishment and tear-down communications) traversing the cloud network 12. As described more below, the browser 22 plays a role in both initial user authentication (e.g., at a time of network login) as well as initiation or "launch" of new remote desktop sessions or other applications. The browser 22 and remote desktop engine 26 also interact with the user 24 in ways described herein.

Figure 4:
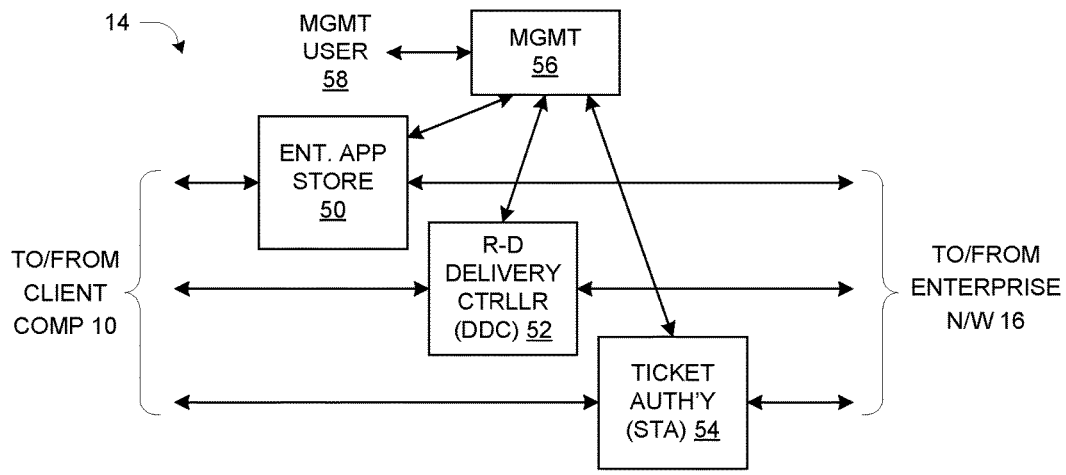
FIG. 4 is a functional block diagram of cloud services servers.

FIG. 4 shows the cloud services servers 14. They include an enterprise application store (ENT APP STORE) 50, remote desktop delivery controller (R-D DELIVERY CTRLLR) 52, and a ticket authority (TICKET AUTH'Y) 54. The remote desktop delivery controller 52 is also referred to as a "desktop delivery controller" or DDC, and the ticket authority 54 is also referred to as a "secure ticket authority" or STA. The servers 14 also include a management server 56 providing for management of the cloud servers 14 by a management user 58.

In operation, the enterprise application store 50 serves as a cloud-based access point via which users 24 access applications/services provided by the enterprise network 16. Various specifics of its functionality are described below. In one embodiment it may be realized as an enhanced version of the StoreFront™ product of Citrix Systems Inc. Pertinent functionality of the DDC 52 and STA 54 is described below.

Figure 5:
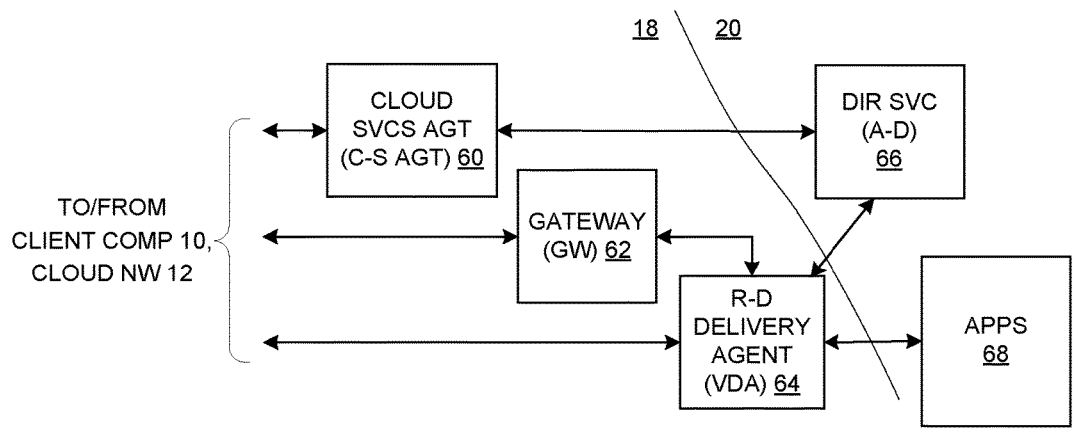
FIG. 5 is a functional block diagram of enterprise network servers.

FIG. 5 shows the servers 18, 20 of the enterprise network 16. Among the cloud interface servers 18 are a cloud services agent (CLOUD SVCS AGT) 60, a gateway 62, and a remote desktop (R-D) delivery agent 64. The cloud services agent 60 is also referred to as C-S AGT; the gateway 62 as a GW; and the remote desktop delivery agent 64 as a "virtual desktop agent" or VDA. The VDA does not expose itself for direct access from the client/cloud. All traffic is proxied through the GW. The applications and services servers 20 include a directory service (DIR SVC) 66 and applications (APPS) 68. As indicated, the directory services 66 may be referred to as an "active directory" or A-D.

Figure 6:
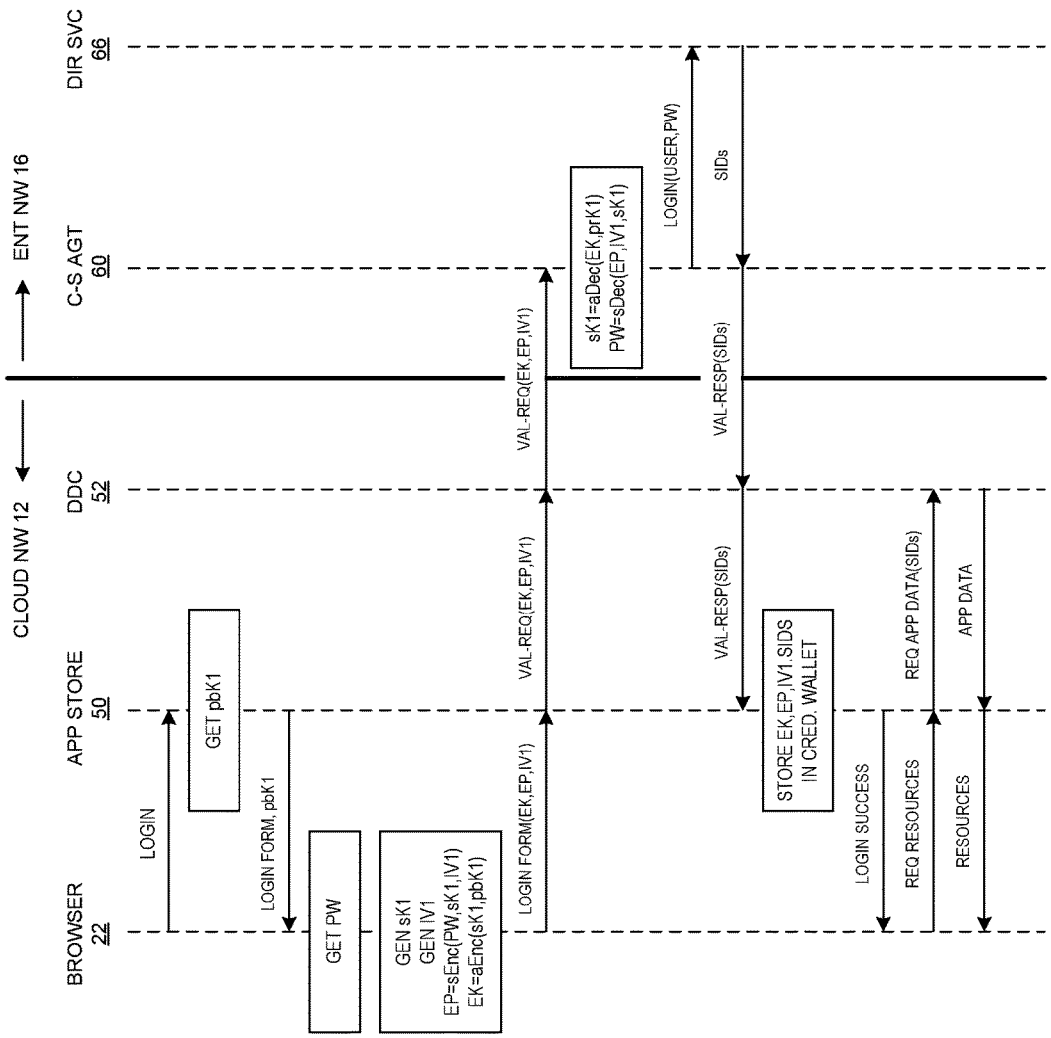
FIGS. 6 and 7 are message flow diagrams depicting system-level operation.
Figure 7:
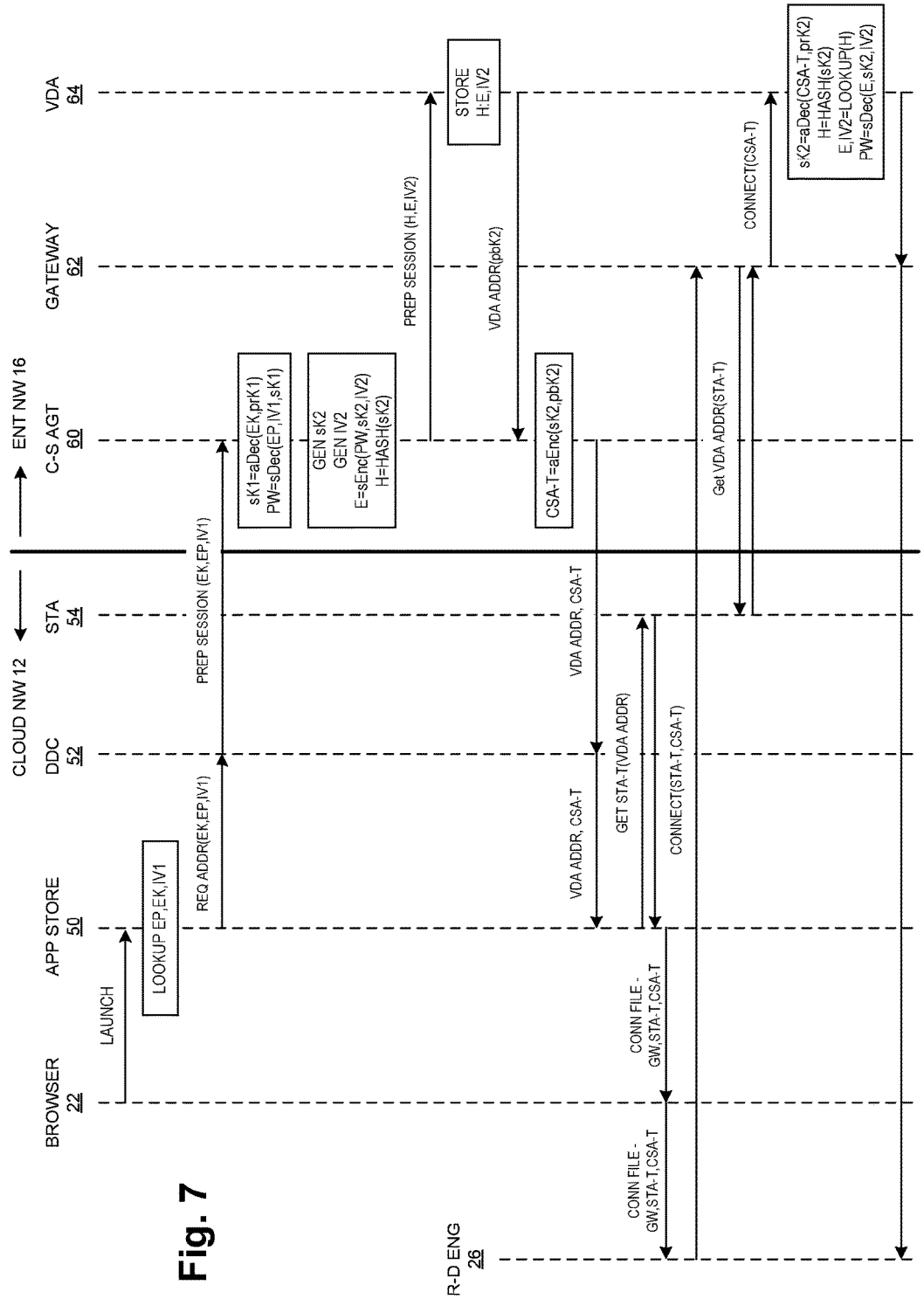

FIGS. 6 and 7 are message-flow diagrams illustrating aspects of operation of the system of FIGS. 1-5. FIG. 6 shows processing and messaging at a time of user login, also referred to as a "login phase". FIG. 7 shows processing and messaging at a later time of launching an application or desktop, also referred to as an "application launching phase".

Referring to FIG. 6, a user initiates a login by directing the browser 22 to the application store 50. The application store 50 looks up or otherwise obtains a first public key denoted pbK1. This is the public key of a private/public key pair for the cloud services agent 60, and will be used in an asymmetric encryption of a user password as described more below. One example of asymmetric encryption is RSA® encryption. The cloud services agent 60 may have previously registered its public key either directly with the application store 50 or with some other intermediary from which the application store 50 obtains it. After obtaining pbK1, the application store 50 returns a login form along with pbK1 to the browser 22.

The browser 22 displays the login form to the user, who enters his/her login credentials which include a user or account name along with a password (PW). These credentials have previously been established within the enterprise network 16, specifically at the A-D server 66. This password may also be referred to herein as the "clear text password" to distinguish it from encrypted versions that are used during communications as described below. In one embodiment, the browser 22 is responsible for encrypting the password before forwarding it into the cloud network 12 (an alternative approach is given below). To this end, the browser 22 generates a first symmetric key denoted sK1 as well as a first initialization vector IV1. These values are used to symmetrically encrypt (sEnc) the password PW to obtain an encrypted password shown as EP. An example symmetric encryption scheme is AES encryption. The browser 22 also asymmetrically encrypts (aEnc) the symmetric key sK1 under pbK1 to obtain an encrypted key shown as EK. Finally, the browser 22 sends EP, EK and IV1 along with the login form to the application store 22.

The application store 50 responds to receipt of the login form by generating a user validation request message shown as VAL-REQ, including EK, EP and IV1, and sending it to the cloud services agent 60 via the DDC 52 as shown.

The cloud services agent 60 decrypts (aDec) the encrypted key EK using its own private key prK1 to obtain the symmetric key sK1, then decrypts (sDec) the encrypted password EP using sK1 and IV1 to recover the clear text password PW. The cloud services agent 60 then validates the user credentials by performing a login operation with the directory service 66, which returns "security identifiers" or SIDs that serve as internal identifiers of the user account(s) within the enterprise network 16. As generally known, SIDs are data structures having values that are globally unique across systems, accounts, and users, as well as time (i.e., they are not reused). The cloud services agent 60 returns a validation response VAL-RESP including the SIDs to the application store 50 via the DDC 52.

The application store 50 saves the SIDs, encrypted key EK, encrypted password EP, and initialization vector IV1 in secure local storage for later use. It also returns an indication of a successful login to the browser 22, which uses the indication to notify the user accordingly. At this point the user may inquire about available applications or services, which are referred to as "resources". The application store 50 requests application data from the DDC 52, and upon receiving it forwards it to the browser 22 where it may be displayed or otherwise provided to the user.

It will be appreciated that by the above process the clear text password PW does not flow through the cloud network 12, and thus security is enhanced. Only the cloud services agent 60 can decrypt the password to authenticate the user with the directory service 66.

FIG. 7 describes operation at a later time when a user initiates or "launches" an application or desktop. This may occur when a user clicks on a hyperlink for the application/desktop, for example. The browser 22 responds by sending a launch message to the application store 50, which looks up the values EP, EK, and IV1 and sends them to the DDC 52 as part of a "request address" (REQ ADDR) message to prepare a new session. The DDC 52 forwards this information to the cloud services agent 60 as part of a prepare session (PREP SESSION) message.

As at login time as described above, the cloud services agent 60 decrypts the encrypted key EK and the encrypted password EP to recover the clear text password PW. The cloud services agent 60 then generates a second symmetric key sK2 and another random initialization vector IV2. It re-encrypts the password using the symmetric key sK2 to generate an encrypted password E. It also calculates a hash H of the symmetric key sK2, e.g., a SHA-256 hash. It then sends a prepare session (PREP SESSION) message to the VDA 64 containing H, E and IV2. In alternative embodiments an alternative type of cryptographic function may be applied to sK2 to generate an alternative cryptographic value in place of the hash H.

The VDA 64 stores the encrypted password E and initialization vector IV2 in association with the hash H, and returns a VDA address (VDA ADDR) message to the cloud services agent 60 that includes a second public key pbK2. This is the public key from a private/public key pair of the VDA 64.

The cloud services agent 60 encrypts (aEnc) the symmetric key using the VDA public key pbK2 to generate a data value referred to as the C-S agent ticket (CSA-T), and sends this to the application store 50 (via the DDC 52) as part of a VDA ADDR message containing the VDA address returned by the VDA 64.

The application store 50 first obtains a second ticket, shown as STA-T, by requesting it from the STA 54. It then sends a connection file (CONN FILE) to the browser 22 that contains an identifier of the gateway (GW) and the two tickets CSA-T and STA-T.

The browser 22 browser invokes the R-D engine 26 with the connection file to enable the R-D engine 26 to connect to the VDA 64 using CSA-T as its authorization. The R-D engine 26 creates a connection request message CONNECT including CSA-T and STA-T and sends it to the gateway 62. The gateway 62 obtains the VDA address from the STA 54, then issues a corresponding CONNECT message to the VDA 64 that includes CSA-T.

The VDA 64 decrypts (aDec) the CSA-T value using its private key prK2 to obtain the symmetric key sK2, and calculates the hash of sK2. It compares the calculated hash with the stored hash value H it received from the cloud services agent 60, and proceeds further with connection establishment only if these hash values match. Assuming a match, the VDA 64 then looks up the stored values E and IV2 using H, and then decrypts (sDec) the encrypted password E using the symmetric key sK2 and initialization vector IV2. The recovered password PW is provided to the directory services 66 to initiate a new session at the operating system level, and a response is returned to the R-D engine 26 indicating successful establishment of the session. At this point other application logic takes over to enable the user to access and utilize the virtualized desktop provided by the VDA 64.

The above process ensures that the encrypted password does not flow back to the browser 22, and that only a one-time ticket CSA-T is sent back to the R-D engine 26. In addition to preventing the same encrypted password from flowing forward and backward between the browser 22 and the cloud services, the illustrated technique also adds asymmetric encryption for the symmetric key sK2 to ensure that the ticket CSA-T travelling through the cloud services cannot be directly used to decrypt the re-encrypted password E.

Figure 8:
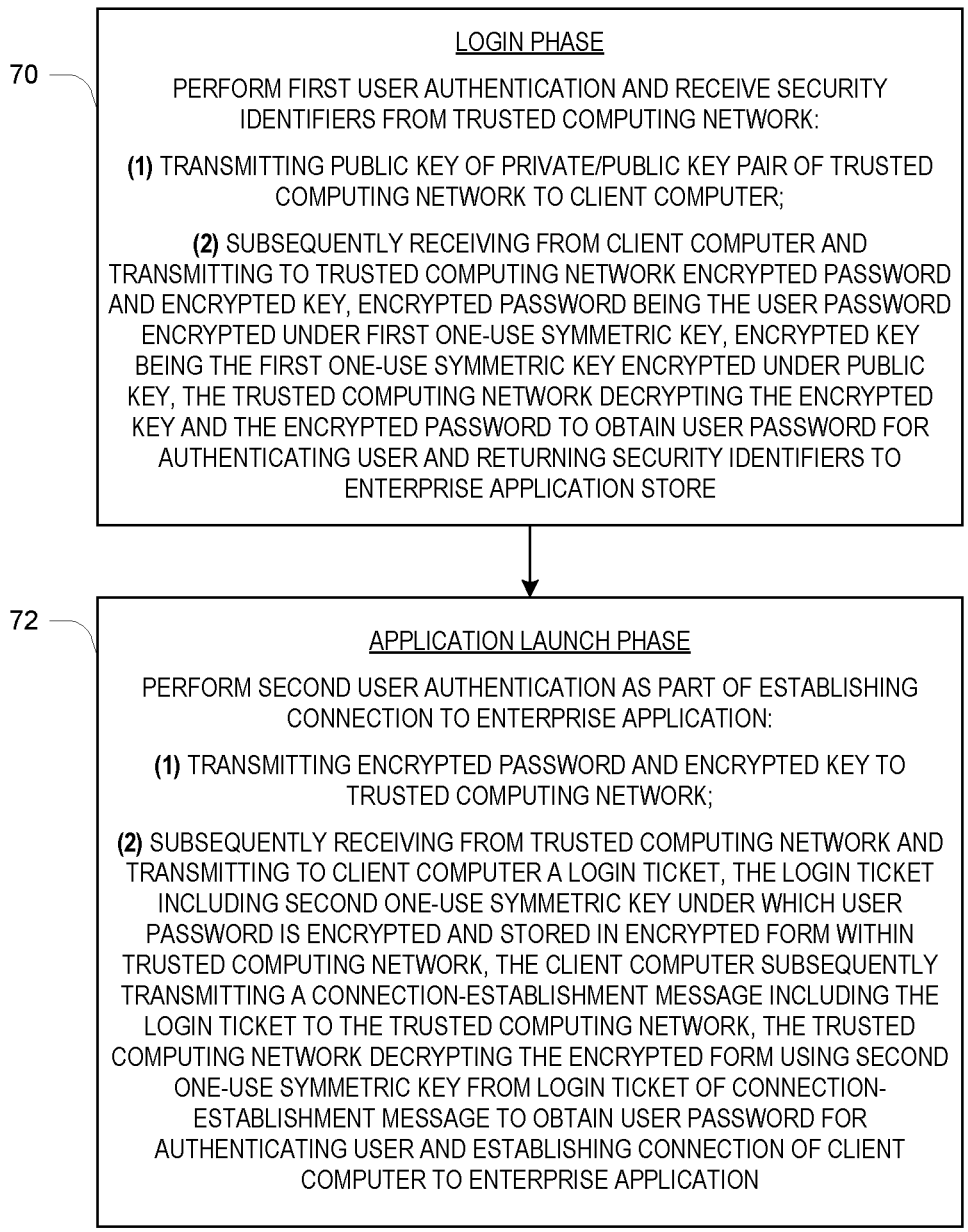

FIGS. 8 and 9 illustrate operations of the application store 50 and cloud services agent 60 respectively in connection with the overall schemes of FIGS. 6 and 7. The description below employs general language along with parentheticals to associate the general terms with examples from the embodiments (e.g., FIGS. 6-7) herein.

As shown in FIG. 8, at 70 the application store 50 operates in the login phase (FIG. 6), performing a first user authentication for a user of the client computer 10 and receiving security identifiers (SIDs) from a trusted computing network (enterprise network 16), the security identifiers identifying the user as an authorized user of the trusted computing network. The first user authentication includes (1) transmitting a public key (pbK1) of a private/public key pair of the trusted computing network to the client computer and (2) subsequently receiving from the client computer and transmitting to the trusted computing network an encrypted password and encrypted key (EP, EK), the encrypted password being a user password (PW) encrypted under a first one-use symmetric key (sK1), the encrypted key being the first one-use symmetric key encrypted under the public key. These values are forwarded to the trusted computing network, which decrypts (aDec) the encrypted key and decrypts (sDec) the encrypted password to obtain the user password for authenticating the user and returning the security identifiers to the enterprise application store.

At 72, in a subsequent application launch phase (FIG. 7), a second user authentication is performed as part of establishing a connection to the enterprise application. The second user authentication includes (1) transmitting the encrypted password and encrypted key (EP, EK) to the trusted computing network and (2) subsequently receiving from the trusted computing network and transmitting to the client computer a login ticket (CSA-T), the login ticket including a second one-use symmetric key (sK2) under which the user password is encrypted and stored in encrypted form within the trusted computing network. The client computer subsequently transmits a connection-establishment message including the login ticket to the trusted computing network. The trusted computing network decrypts the encrypted form using the second one-use symmetric key from the login ticket of the connection-establishment message to obtain the user password for authenticating the user and establishing the connection of the client computer to the enterprise application. In one embodiment, operation at 72 may also include the asymmetric encryption and decryption of the symmetric key sK2 using another private/public key pair (prK2, pbK2) of the trusted computing network.

As shown in FIG. 9, at 80 the cloud services agent 60 operates in a login phase (FIG. 6), performing a first user authentication for a user of the client computer and receiving and forwarding security identifiers to an enterprise application store executing in the untrusted cloud computing network, the security identifiers identifying the user as an authorized user of the trusted computing network. The first user authentication includes (1) receiving a validation request for the user, the validation request including an encrypted password (EP) and an encrypted key (EK), the encrypted password being a user password of the user encrypted under a first one-use symmetric key (sK1), the encrypted key being the first one-use symmetric key encrypted under a public key (prK1) of a private/public key pair of the cloud services agent, and (2) decrypting the encrypted key and the encrypted password to obtain the user password, and performing a local login operation in the trusted computing network to authenticate the user and return the security identifiers to the enterprise application store.

At 82, in a subsequent application launch phase (FIG. 7), a second user authentication is performed as part of establishing the connection to the enterprise application. The second user authentication includes (1) receiving the encrypted password and the encrypted key from the enterprise application store and decrypting the encrypted key and encrypted password to obtain the user password, (2) re-encrypting the user password under a second one-use symmetric key (sK2) to generate a second encrypted password (E), and calculating a cryptographic function (e.g., hash) of the second one-use symmetric key to generate a cryptographic value (H), (3) forwarding the second encrypted password and cryptographic value to an application delivery agent (VDA) of the trusted computing network for subsequent use in confirming authenticity of a subsequent connection request from the client computer, and (4) sending a login ticket (CSA-T) to the enterprise application store, the login ticket including the second symmetric key to enable the client computer to include a reference to the second encrypted password and cryptographic value in the subsequent connection request to the application delivery agent. In FIG. 7 the second symmetric key is asymmetrically encrypted before being included in the login ticket, which provides additional security but may not be required in all embodiments.

As noted above with reference to FIG. 6, in an alternative embodiment an additional step could be used in which the browser 22 verifies that pbK1 belongs to the intended organization before forwarding the encrypted password to the cloud network.

In this case, the pbK1 is sent to the browser as part of a digital X.509 certificate which is issued to the owner organization (for example the company which owns the on-premises services and is renting the cloud services from a cloud service provider). The digital certificate contains pbK1 and the name of the organization issued to. Alternatively the certificate may be signed by a trusted certificate authority (or a certificate chain ending in a trusted certificate authority). Alternatively it may be self-signed. This certificate might be similar in form to an SSL website certificate or a digital certificate belonging to an email sender, but in this case it belongs to the organization which owns the asymmetric keypair pbK1/prK1 and identifies that organization in the Distinguished Name within the certificate.

The browser 22 then validates that the organization identified in the certificate is trusted (that the certificate belongs to the organization the user is logging into via the app store) before using the associated pkB1 to encrypt the user's password.

The verification may include that the certificate chain ends in a trusted Root CA along with the normal certificate chain validations, that the digital certificate belongs to the expected organization, or that the fingerprint of a self-signed certificate matches an expected value.

The verification could occur by displaying the Distinguished Name including the organization the certificate was issued to the user who then verifies this is the intended organization before entering their credentials, alternatively the user could be shown the fingerprint of the self-signed certificate and manually verify this against the expected value before proceeding. Alternatively the verification check could be performed automatically via policy configuration stored in the Browser via Local Storage or retrieved from a trusted URL which policy may contain the fingerprint of a trusted self-signed certificate, or the expected Distinguished Name including the organization that the certificate was issued to as part of a certificate chain ending in a trusted root certificate authority.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a computer in an untrusted cloud computing network as a cloud-based enterprise application store via which a client computer establishes a connection to an enterprise application executing in a trusted computing network, comprising:
in a login phase, performing a first user authentication for a user of the client computer and receiving security identifiers from the trusted computing network, the security identifiers identifying the user as an authorized user of the trusted computing network, the first user authentication including (1) transmitting a public key of a private/public key pair of the trusted computing network to the client computer and (2) subsequently receiving from the client computer and transmitting to the trusted computing network an encrypted password and encrypted key, the encrypted password being a user password encrypted under a first one-use symmetric key, the encrypted key being the first one-use symmetric key encrypted under the public key, the trusted computing network decrypting the encrypted key and the encrypted password to obtain the user password for authenticating the user and returning the security identifiers to the enterprise application store; and
in a subsequent application launch phase, performing a second user authentication as part of establishing the connection to the enterprise application, the second user authentication including (1) transmitting the encrypted password and encrypted key to the trusted computing network and (2) subsequently receiving from the trusted computing network and transmitting to the client computer a login ticket, the login ticket including a second one-use symmetric key under which the user password is encrypted and stored in encrypted form within the trusted computing network, the client computer subsequently transmitting a connection-establishment message including the login ticket to the trusted computing network, the trusted computing network decrypting the encrypted form using the second one-use symmetric key from the login ticket of the connection-establishment message to obtain the user password for authenticating the user and establishing the connection of the client computer to the enterprise application.

2. The method of claim 1, wherein the connection of the client computer to the enterprise application is via a remote desktop session delivered by a virtual desktop agent of the enterprise network, and wherein the connection-establishment message is a request from the client computer for the virtual desktop agent to initiate the remote desktop session.

3. The method of claim 1, wherein the trusted computing network includes a cloud interface server and one or more application/services servers, the application/services servers hosting the enterprise application, the cloud interface server providing a local interface to the enterprise application store, and wherein the private/public key pair of the trusted computing network is a private/public key pair of the cloud interface server.

4. The method of claim 1, wherein the second one-use symmetric key is in encrypted form in the login ticket, the encrypted form having been asymmetrically encrypted with a second public key of a second private/public key pair of the enterprise network so as to be securely transmitted in the cloud network and decrypted only within the enterprise network.

5. The method of claim 1, wherein:
the second user authentication in the application launch phase includes obtaining a second login ticket from a ticket authority of the cloud network and transmitting the second login ticket to the client computer;
the connection-establishment message is transmitted to a gateway of the enterprise network which uses the second login ticket in an exchange with the ticket authority to obtain an address for a virtual desktop agent of the enterprise network to which the connection-establishment message is to be sent, and subsequently sends the connection-establishment message to the virtual desktop agent.

6. A method of operating a computer in a trusted computing network as a cloud services agent via which a client computer in untrusted cloud computing network establishes a connection to an enterprise application executing in the trusted computing network, comprising:
in a login phase, performing a first user authentication for a user of the client computer and receiving and forwarding security identifiers to an enterprise application store executing in the untrusted cloud computing network, the security identifiers identifying the user as an authorized user of the trusted computing network, the first user authentication including (1) receiving a validation request for the user, the validation request including an encrypted password and an encrypted key, the encrypted password being a user password of the user encrypted under a first one-use symmetric key, the encrypted key being the first one-use symmetric key encrypted under a public key of a private/public key pair of the cloud services agent, and (2) decrypting the encrypted key and the encrypted password to obtain the user password and performing a local login operation in the trusted computing network to authenticate the user and return the security identifiers to the enterprise application store; and
in a subsequent application launch phase, performing a second user authentication as part of establishing the connection to the enterprise application, the second user authentication including (1) receiving the encrypted password and the encrypted key from the enterprise application store and decrypting the encrypted key and encrypted password to obtain the user password, (2) re-encrypting the user password under a second one-use symmetric key to generate a second encrypted password, and calculating a cryptographic function of the second one-use symmetric key to generate a cryptographic value, (3) forwarding the second encrypted password and cryptographic value to an application delivery agent of the trusted computing network for subsequent use in confirming authenticity of a subsequent connection request from the client computer, and (4) sending a login ticket to the enterprise application store, the login ticket including the second symmetric key to enable the client computer to include a reference to the second encrypted password and cryptographic value in the subsequent connection request to the application delivery agent.

7. The method of claim 6, wherein the connection of the client computer to the enterprise application is via a remote desktop session delivered by a virtual desktop agent of the enterprise network, and wherein the connection-establishment message is a request from the client computer for the virtual desktop agent to initiate the remote desktop session.

8. The method of claim 6, further including asymmetrically encrypting the second one-use symmetric key into an encrypted form and including the encrypted form in the login ticket, the encrypting using a second public key of a second private/public key pair of the enterprise network, the second one-use symmetric key being securely transmitted in the cloud network and decrypted only within the enterprise network.

9. The method of claim 6, wherein the cryptographic function is a secure hash function and the cryptographic value is a hash value, the hash value being used by the application delivery agent as an index for storing in association with the second encrypted password to enable subsequent retrieval of the second encrypted password based on the hash value during the subsequent use in confirming authenticity of the subsequent connection request from the client computer.

10. The method of claim 6, wherein performing the local login operation includes sending a login message containing the user password to a directory server of the enterprise network.

11. A special-purpose computer for use in an untrusted cloud computing network as a cloud-based enterprise application store via which a client computer establishes a connection to an enterprise application executing in a trusted computing network, comprising:
  interface circuitry providing interfaces to the client computer and to the trusted computing network; and
  processing circuitry storing and executing computer program instructions to cause the special-purpose computer to:
    in a login phase, perform a first user authentication for a user of the client computer and receive security identifiers from the trusted computing network, the security identifiers identifying the user as an authorized user of the trusted computing network, the first user authentication including (1) transmitting a public key of a private/public key pair of the trusted computing network to the client computer and (2) subsequently receiving from the client computer and transmitting to the trusted computing network an encrypted password and encrypted key, the encrypted password being a user password encrypted under a first one-use symmetric key, the encrypted key being the first one-use symmetric key encrypted under the public key, the trusted computing network decrypting the encrypted key and the encrypted password to obtain the user password for authenticating the user and returning the security identifiers to the enterprise application store; and
    in a subsequent application launch phase, perform a second user authentication as part of establishing the connection to the enterprise application, the second user authentication including (1) transmitting the encrypted password and encrypted key to the trusted computing network and (2) subsequently receiving from the trusted computing network and transmitting to the client computer a login ticket, the login ticket including a second one-use symmetric key under which the user password is encrypted and stored in encrypted form within the trusted computing network, the client computer subsequently transmitting a connection-establishment message including the login ticket to the trusted computing network, the trusted computing network decrypting the encrypted form using the second one-use symmetric key from the login ticket of the connection-establishment message to obtain the user password for authenticating the user and establishing the connection of the client computer to the enterprise application.

12. The special-purpose computer of claim 11, wherein the connection of the client computer to the enterprise application is via a remote desktop session delivered by a virtual desktop agent of the enterprise network, and wherein the connection-establishment message is a request from the client computer for the virtual desktop agent to initiate the remote desktop session.

13. The special-purpose computer of claim 11, wherein the trusted computing network includes a cloud interface server and one or more application/services servers, the application/services servers hosting the enterprise application, the cloud interface server providing a local interface to the enterprise application store, and wherein the private/public key pair of the trusted computing network is a private/public key pair of the cloud interface server.

14. The special-purpose computer of claim 11, wherein the second one-use symmetric key is in encrypted form in the login ticket, the encrypted form having been asymmetrically encrypted with a second public key of a second private/public key pair of the enterprise network so as to be securely transmitted in the cloud network and decrypted only within the enterprise network.

15. The special-purpose computer of claim 11, wherein:
  the second user authentication in the application launch phase includes obtaining a second login ticket from a ticket authority of the cloud network and transmitting the second login ticket to the client computer;
  the connection-establishment message is transmitted to a gateway of the enterprise network which uses the second login ticket in an exchange with the ticket authority to obtain an address for a virtual desktop agent of the enterprise network to which the connection-establishment message is to be sent, and subsequently sends the connection-establishment message to the virtual desktop agent.

16. A special-purpose computer for use in a trusted computing network as a cloud services agent via which a client computer in untrusted cloud computing network establishes a connection to an enterprise application executing in the trusted computing network, comprising:
  interface circuitry providing interfaces to the client computer and to the trusted computing network; and
  processing circuitry storing and executing computer program instructions to cause the special-purpose computer to:
    in a login phase, perform a first user authentication for a user of the client computer and receive and forward security identifiers to an enterprise application store executing in the untrusted cloud computing network, the security identifiers identifying the user as an authorized user of the trusted computing network, the first user authentication including (1) receiving a validation request for the user, the validation request including an encrypted password and an encrypted key, the encrypted password being a user password of the user encrypted under a first one-use symmetric key, the encrypted key being the first one-use symmetric key encrypted under a public key of a private/public key pair of the cloud services agent, and (2) decrypting the encrypted key and the encrypted password to obtain the user password and performing a local login operation in the trusted computing network to authenticate the user and return the security identifiers to the enterprise application store; and in a subsequent application launch phase, perform a second user authentication as part of establishing the connection to the enterprise application, the second user authentication including (1) receiving the encrypted password and the encrypted key from the enterprise application store and decrypting the encrypted key and encrypted password to obtain the user password, (2) re-encrypting the user password under a second one-use symmetric key to generate a second encrypted password, and calculating a cryptographic function of the second one-use symmetric key to generate a cryptographic value, (3) forwarding the second encrypted password and cryptographic value to an application delivery agent of the trusted computing network for subsequent use in confirming authenticity of a subsequent connection request from the client computer, and (4) sending a login ticket to the enterprise application store, the login ticket including the second symmetric key to enable the client computer to include a reference to the second encrypted password and cryptographic value in the subsequent connection request to the application delivery agent.

17. The special-purpose computer of claim 16, wherein the connection of the client computer to the enterprise application is via a remote desktop session delivered by a virtual desktop agent of the enterprise network, and wherein the connection-establishment message is a request from the client computer for the virtual desktop agent to initiate the remote desktop session.

18. The special-purpose computer of claim 16, further including asymmetrically encrypting the second one-use symmetric key into an encrypted form and including the encrypted form in the login ticket, the encrypting using a second public key of a second private/public key pair of the enterprise network, the second one-use symmetric key being securely transmitted in the cloud network and decrypted only within the enterprise network.

19. The special-purpose computer of claim 16, wherein the cryptographic function is a secure hash function and the cryptographic value is a hash value, the hash value being used by the application delivery agent as an index for storing in association with the second encrypted password to enable subsequent retrieval of the second encrypted password based on the hash value during the subsequent use in confirming authenticity of the subsequent connection request from the client computer.

20. The special-purpose computer of claim 16, wherein performing the local login operation includes sending a login message containing the user password to a directory server of the enterprise network.

* * * * *